(12) United States Patent
Specht

(10) Patent No.: US 6,371,397 B1
(45) Date of Patent: *Apr. 16, 2002

(54) SEAT BELT RETRACTOR

(75) Inventor: Martin Specht, Feldafing (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/665,997

(22) Filed: Sep. 20, 2000

(30) Foreign Application Priority Data

Mar. 21, 2000 (DE) .......................... 100 13 869

(51) Int. Cl.[7] .............................................. B60R 22/44
(52) U.S. Cl. .................................. 242/375.1; 242/390.8
(58) Field of Search .......................... 242/375.1, 375.3, 242/390.8, 390.9; 280/807, 806; 297/476, 477, 478

(56) References Cited

U.S. PATENT DOCUMENTS

| | | | |
|---|---|---|---|
| 4,478,433 A | 10/1984 | Taguchi et al. | 280/807 |
| 4,588,144 A | 5/1986 | Nishimura | |
| 4,592,520 A * | 6/1986 | Kawaguchi | 242/375.1 |
| 4,637,630 A * | 1/1987 | Nishimura et al. | 280/807 |
| 4,726,537 A | 2/1988 | Escaravage | |
| 4,787,569 A | 11/1988 | Kanada et al. | |
| 5,611,497 A * | 3/1997 | Krambeck et al. | 242/375.1 |

FOREIGN PATENT DOCUMENTS

| | | |
|---|---|---|
| DE | 2526494 | 12/1976 |
| DE | 2742676 | 4/1979 |
| DE | 3019298 | 11/1981 |
| DE | 3149573 | 6/1983 |
| DE | 4112620 | 5/1992 |
| DE | 19636448 | 4/1997 |
| DE | 19731689 | 7/1999 |
| EP | 0893313 | 7/1998 |
| EP | 1074439 | 8/2000 |
| JP | 10167002 | 6/1998 |

* cited by examiner

Primary Examiner—John M. Jillions
(74) Attorney, Agent, or Firm—Lonnie Drayer

(57) ABSTRACT

A seat belt retractor has a winding shaft for winding a seat belt. A motive spring biases the winding shaft in the winding direction of the seat belt. A drive unit provides at least partial relaxation of the motive spring when the seat belt is at least partially unwound. A bridging device can also be provided, by means of which the winding shaft can be driven more directly by the drive unit during a process of winding the seat belt.

6 Claims, 2 Drawing Sheets

SEAT BELT RETRACTOR

FIELD OF THE INVENTION

The present invention relates to a seat belt retractor.

BACKGROUND OF THE INVENTION

A seat belt retractor returns a seat belt to its fully retracted position after use. The seat belt is wound onto a winding shaft until it comes into the vicinity of the vehicle's B-pillar in the fully retracted position.

It is well known to use a motive spring, for example in the form of a spiral spring, to rotate the winding shaft. One end of the motive spring is connected in a non-rotatable manner to the winding shaft and the other end of the motive spring rests on a fixed point, for example the casing of the retractor fixed to the vehicle structure. While the seatbelt is in use the spiral spring constantly applies a force to the seatbelt webbing in the retracting direction. While handling the seatbelt, the vehicle occupant will feel a constant pull on the seatbelt webbing, and when the vehicle occupant releases the unbuckled seatbelt, the seatbelt will return to its fully retracted position. While the seatbelt is in use the vehicle occupant may experience some discomfort because the seatbelt could be too snug or tight.

DISCUSSION OF THE PRIOR ART

A so-called comfort retractor is known, for example from published German patent application 41 12 620, to overcome the above-described problems. An electric motor is provided for the winding process in addition to the motive spring. The motive spring is held in a spring casing, the inner end of the motive spring in turn being connected in a non-rotatable manner to the winding shaft, but the outer end acting on the internal periphery of the spring casing. External teeth that engage a pinion of the motor are provided on the outer periphery of the spring casing. If the belt webbing is unwound or pulled out by hand, the electric motor is supplied with current and moves the spring casing in the direction of rotation increasing the bias of the motive spring until a blocking device responds and prevents further rotation after a predetermined number of rotations of the motor. In this biased state the motive spring the spring casing is held by the stopped electric motor until the tongue is inserted into the buckle and a switch is opened. The winding spring then turns the spring casing back again, the force of application of the belt webbing being reduced so it is no longer unpleasant for the vehicle occupant.

If the tongue is pulled out of the buckle, the above-mentioned switch closes again and restarts the electric motor. The winding spring is then biased again by rotation of the spring casing to such an extent that it reliably retracts and re-winds the belt webbing.

The foregoing solution from the prior art is unsatisfactory in so far as a certain amount of time elapses after release of the tongue from the buckle, until the actual winding process that is brought about by the motive spring. This delay is due to the motor initially having to bring the spring casing back into a position in which the motive spring is tensioned in such a way that it can perform a winding process.

Owing to the bridging device it is possible, even with a motive spring having only low, or no, spring tension to begin the winding process immediately after release of the tongue from the buckle, by using the force of the motor drive unit for the winding process. In contrast to the aforementioned state of the art, the motive spring is not used for the winding process, but the drive unit, in particular the motor contained therein, which is preferably an electric motor, in the retractor according to the invention.

If the bridging device is to act directly between drive unit and winding shaft the drive unit would have to be arranged in the vicinity of the winding shaft, and this necessitates an additional configuration to enable the drive unit to be used for relaxing the motive spring when the tongue is inserted into the buckle. In user-friendly retractors, the motive spring is frequently accommodated in a rotatable spring casing to which the torque of the drive unit can be transmitted. In such a case it is advantageous for a compact construction of the retractor if the bridging device, on the one hand, is connected in a non-rotatable manner to the spring casing and, on the other hand, can be brought into rotational engagement with the winding shaft for transmitting a torque of the drive unit.

In principle, the bridging device can have quite different designs. A particularly advantageous solution can be achieved if the bridging device is a centrifugal clutch (switched according to the number of revolutions). This has the advantage that the bridging device is only "connected" when a specific, predetermined speed is exceeded. The drive unit can be used both during the relaxation process of the motive spring when the seat belt is applied and during the winding process. If the speed of the drive unit is lower than the aforementioned limit value, the bridging device remains "disconnected" and the drive unit can rotate the spring casing into the load releasing direction of the motive spring. If the speed of the drive unit exceeds the limit value, the bridging device is automatically switched and the drive unit drives the winding shaft for winding the belt webbing.

In the switched state the centrifugal clutch can produce an interlocking fit or frictional contact for torque transmission between the drive unit and the winding shaft, frictional contact being preferred.

The construction of the centrifugal clutch can, in turn, be quite different. It is particularly advantageous if the centrifugal clutch comprises at least one spring element that changes its shape elastically under the influence of the torque and is formed by at least one damping element. The damping element has bringing about speed-dependent switching in such a way that the centrifugal clutch remains disconnected at a speed of the drive unit below a predetermined limit value but the centrifugal clutch produces frictional contact with the winding shaft when the limit value is exceeded. The spring element can annularly surround the winding shaft.

SUMMARY OF THE INVENTION

There is provided in accordance with the invention a seat belt retractor comprising a winding shaft for winding a seat belt, a motive spring for biasing the winding shaft in the winding direction of the seat belt and a drive unit for the at least partial relaxation of the motive spring when the seat belt is at least partially unwound, wherein a bridging device is provided by means of which the winding shaft can be driven directly by the drive unit during a winding process of the seat belt.

DETAILED DESCRIPTION OF THE INVENTION

The terms "top", "bottom", "left" and "right" used in connection with the description relate to the invention as it is shown in the accompanying figures.

Figure 1:
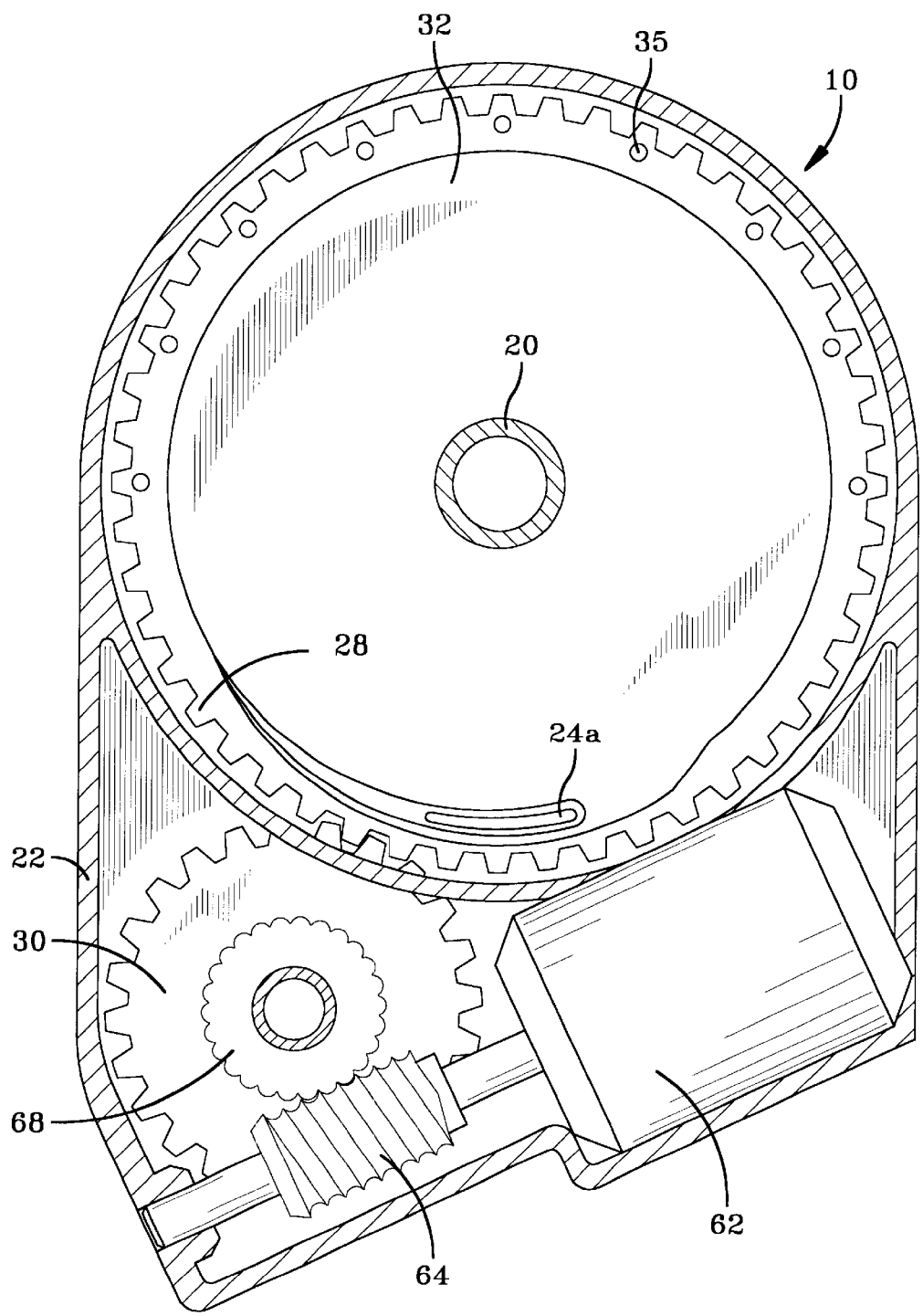
FIG. 1 is a cross-section through a schematically reproduced retractor.

The seat belt retractor 10 according to the invention shown in FIG. 1 comprises a winding shaft 20 that is arranged horizontally in a spring cartridge 22 which also forms the casing of the retractor. with its left end 20a, the winding shaft 20 passes through the left vertical wall 22a of the spring cartridge 22. A winding drum, not shown in detail, for the belt webbing of a seat belt is arranged in a non-rotatable manner at the left end 20a of the winding shaft 20.

A spring casing 24 that accommodates a motive spring 26 in the form of a spiral spring is provided in the interior of the spring cartridge 22 on the left vertical wall 22a of the spring cartridge. The motive spring is connected in a non-rotatable manner to the winding shaft 20 at its inner end and is fastened on a fixing point 24a on the internal periphery of the spring casing 24 at its outer end. The motive spring 26 exerts a winding bias on the belt webbing when the belt webbing has been unwound by a vehicle occupant.

At the outer periphery of the spring casing 24 there are external teeth 28 that mesh with a gear 30 that is a component of a drive unit 60 of the retractor which will be described in more detail hereinafter.

Figure 2:
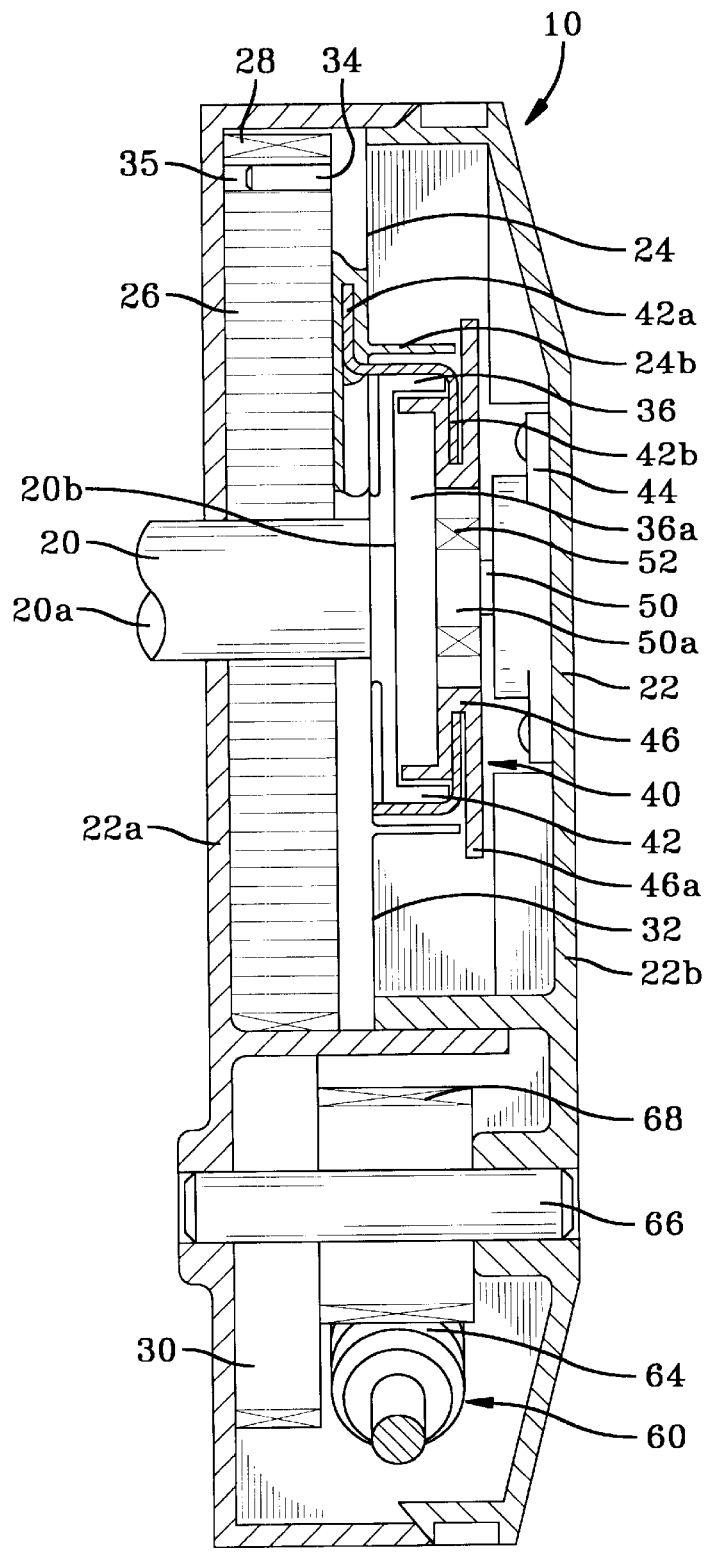
FIG. 2 is a section through the retractor according to the invention reproduced in FIG. 1.

At the right end of the spring casing 24 there is a covering disc 32 that is connected in a non-rotatable manner to the spring casing 24 by a plurality of pegs 34 that are pressed into holes 35 (see also FIG. 2). In FIG. 1 one of the pegs 34 is shown in one of the holes 35.

As shown in FIG. 1, the winding shaft 20 completely penetrates the spring casing 24 and the covering disc 32. At the right end 20b of the winding shaft 20 adjoining the covering disc 32 there is provided an annular clutch member 36 that is connected to the winding shaft and has an external diameter that is significantly greater than the external diameter of the winding shaft 20. The clutch member 36 surrounds a receiving space 36a that is open toward the right end 20b of the winding shaft 20 and of which the internal diameter is also greater than the external diameter of the winding shaft.

A wide variety of configurations can be provided as a spring element. It is particularly advantageous if the spring element is a helical wrap spring having one end connected in a non-rotatable manner to the drive unit and the other end connected in a non-rotatable manner to the damping element. A bridging device 40 comprises a helical wrap spring 42 and a damping element 44 that acts on the covering disc 32 of the spring casing 24. The helical wrap spring 42 is provided on the outer periphery of the clutch member 36 coaxial with the winding shaft 20. One end 42a of the helical wrap spring 42 is fastened in the cover disc 32 whereas the other end 42b of the helical wrap spring 42 engages an annular extension 46 of the damping element 44. Each end 42a, 42b of the wrap spring 42 is connected in a non-rotatable manner to its associated components 32, 46. When a torque is exerted on the helical wrap spring at one end and the other end is simultaneously held by the damping element, the diameter of the wrap spring decreases resulting in frictional contact with the winding shaft.

As shown in FIG. 2, the damping element 44 is arranged on the right vertical wall 22b of the spring cartridge 22. The damping element 44 has an output shaft 50 that extends horizontally to the left and is aligned axially with the central axis of the winding shaft 20. For achieving a compact construction of the retractor 10, the distance between the two shafts 20, 50 is so small that the two mutually opposed shaft ends 20a, 50a do not contact one another. Teeth 52 are provided on the left shaft end 50a of the output shaft 50 for non-rotatable connection to the annular extension 46. The annular extension 46 of the damping element 44 is connected in a non-rotatable manner to the output shaft 50 via these teeth 52.

As shown in FIG. 1, the annular extension 46 has an external diameter that is slightly smaller than the internal diameter of the clutch member 36. The annular extension 46 extends into the clutch member 36.

To prevent the helical wrap spring 42 from spreading radially outwardly, an axially extending centering cage 24b is provided on the cover disc 24. The centering cage 24a has an internal diameter that is greater than the external diameter of the helical wrap spring 42 and an axial length that is slightly greater than the axial length of the clutch member 36. To avoid axial spreading, in particular to the right, an axially extending projection 46a is also shaped on the annular extension 46, the external diameter of the projection being greater than the external diameter of the centering cage 24b. The radial projection 46a is at only a small distance from the face end of the centering cage 24b, so that the helical wrap spring 42 is securely encapsulated.

To support the motive spring, it is advantageous if the drive unit is self-locking in design. This can be achieved, for example, by providing a worm gear 64 between the motor of the drive unit and the spring casing. The drive unit 60 comprises an electric motor 62. A worm gear 64 is connected to the output shaft of the motor 62. An intermediate shaft 66 that extends substantially perpendicularly to the worm gear 64 is mounted in a rotatable manner but axially rigidly in the spring cartridge 22. A gear 68 meshing with the worm gear 64 attached in a non-rotatable manner on the intermediate shaft 66 as well as the aforementioned gear 30 are provided in the spring cartridge 22 below the spring casing 24. The gear 30 is mounted in a non-rotatable manner on the intermediate shaft 66 to the left of the gear 68. The drive unit 60, in particular the motor 62, are connected to a controller, not shown in detail, that controls the operation of the drive unit.

The mode of operation of the retractor according to the invention will be described hereinafter. It is initially assumed that the belt webbing is located in the stored, or fully retracted, position, i.e. the belt webbing is wound completely on the winding drum and substantially relaxes the motive spring 26. If the belt webbing is drawn out manually for a belt application process, the winding shaft 20 rotates, as does the end of the motive spring 26 connected in a non-rotatable manner to the winding shaft. As, on the other hand, the drive device 60 is self-locking, the other end of the motive spring 26 connected to the spring casing 24 at the fixing point 24a is not rotated, so that the motive spring 26 is tensioned.

Once the tongue has latched into the buckle, this state is relayed to the controller of the drive unit 60 via a switch located in the buckle. The motor 62 is then set into operation and the spring casing 24 displaced via the drive unit 60. The external teeth 28 are moved at low speed into a position such that the motive spring 26 is located in a so-called user-friendly position, i.e. in a state of spring tension lower than the state of tension caused by the unwinding process. As a result, the belt webbing now lies relatively slackly on the vehicle occupant. This "relaxation process" of the motive spring 26 is effected by the winding shaft 20 and the end of the motive spring 26 connected to it remaining at rest after the latching of the tongue into the buckle and the spring casing 24 as well as the end of the motive spring 26 connected to the spring casing 24 at the fixing point 24a is rotated in the relaxation direction.

During this movement of the spring casing 24, the cover disc 32 is also rotated and the end 42a of the helical wrap spring 42 rigidly connected to the cover disc 32. However, as the speed of the drive unit 60 is low in this case and the damping of the damping element 40 is adjusted in such a way that the other end 42b of the helical wrap spring can also be rotated, there is no change to the shape of the helical wrap spring 42, in particular the helical wrap spring does not come into contact with the clutch member 36 of the winding shaft 20.

If the tongue is released from the buckle for a belt-removing process, this is detected by the switch located in the buckle and relayed to the control device of the drive unit 60. The drive unit is then set into rotation in a direction of rotation opposed to the attainment of the above-mentioned user-friendly position at a speed which is higher than the speed for the relaxation process of the motive spring 26. This speed is selected so high and the damping of the damping element 40 adapted to it in such a way that the damping of the damping element is "overcome", i.e. the end 42b of the helical wrap spring 42 is held by the damping element and initially remains at a standstill. On the other hand, the end 42a of the wrap spring 42 is set into rotation together with the cover disc 32. The internal diameter of the wrap spring 42 is thus reduced and comes into contact with the external peripheral face of the clutch member 36. Frictional contact between the helical wrap spring 42 and the external peripheral surface of the clutch member 36 of the winding shaft 20 is thus formed. The motive spring 26 is consequently bridged over and the winding shaft set into rotation by the drive unit 60 via the spring casing 24 and the helical wrap spring 42, so that a winding process is performed. The motive spring 26 remains at rest. On the other hand, the output shaft 50 of the damping element 40 also rotates after a short time delay. This time delay is sufficient to hold the right end 42b of the helical wrap spring 42 in such a way that the frictional contact between the spring and the clutch member 36 is produced.

The belt webbing is wound by the drive unit 60 until the parking position has been reached. This state can be established by monitoring the power consumption of the motor 62. Further rotation of the winding shaft 20 and of the motor is no longer possible once the belt webbing has reached the parking position. As the motor remains switched on, but can no longer rotate, its power consumption increases. This increase can be detected and the motor can then be switched off.

After reaching the stored position of the belt webbing, the drive unit 60 is also used to approach the zero position of the motive spring 26, i.e. to relax it at least almost completely. This again takes place at the lower speed of the motor 62 already mentioned.

Alternatively, it is also possible to carry out the operation of application only with the user-friendly spring position. The motive spring can also remain in the user-friendly position in the parking position.

Although the invention has been described in considerable detail with reference to certain versions thereof, other versions are possible. It should be understood that the embodiments described herein are merely exemplary and that many alternative embodiments and additional embodiments will become apparent to those skilled in the art. Accordingly such alternative embodiments are to be construed as being within the scope of the present invention even though not explicitly set forth herein, the present invention being limited only by the content and scope of the claims appended hereto.

I claim:

1. A seat belt retractor comprising:

(a) a winding shaft for winding a seat belt webbing thereon;

(b) a motive spring for biasing the winding shaft in a direction for winding the seat belt, the motive spring being located in a rotatable spring casing;

(c) a drive unit for the at least partial relaxation of the motive spring when the seat belt is at least partially unwound, the torque of the drive unit can be transmitted to the rotatable spring casing; and (d) a clutch member that produces frictional contact for transmitting torque between the drive unit and the winding shaft such that the winding shaft can be driven directly by the drive unit during a winding process of the seat belt, the clutch member has an annular portion that is connected to the winding shaft and has a greater diameter than the diameter of the winding shaft, the clutch member comprising at least one helical wrap spring that surrounds the winding shaft in an annular manner and has one end that is connected in a non-rotatable manner to the drive unit, the clutch member changes shape elastically under the influence of a torque and comprises at least one damping element, the clutch member is connected in a non-rotatable manner to the spring casing and is brought into rotational engagement with the winding shaft by the helical wrap spring for transmitting torque from the drive unit.

2. The seat belt retractor according to claim 1 wherein the damping element has an output shaft on which one end of the spring element acts in a non-rotatable manner and that is arranged coaxially with the winding shaft.

3. The seat belt retractor according to claim 2 wherein the output shaft of the damping element has an end with an annular extension having an external diameter that is greater than the external diameter of the output shaft but smaller than the internal diameter of the clutch member.

4. The seat belt retractor according to claim 3 wherein the damping element is supported in a stationary manner on the casing of the retractor.

5. The seat belt retractor according to claim 4 wherein the motive spring remains at least slightly biased after the belt webbing has been wound on the winding spool.

6. The seat belt retractor according to claim 5 wherein the attainment of the completely wound state of the belt webbing can be monitored via an increase in the power consumption of the drive unit.

* * * * *